(12) United States Patent
Vokaliga et al.

(10) Patent No.: US 12,346,206 B2
(45) Date of Patent: Jul. 1, 2025

(54) INCREMENTAL SNAPSHOT RECOVERY FROM REMOTE STORAGE SYSTEM

(71) Applicant: EMC IP Holding Company LLC, Hopkinton, MA (US)

(72) Inventors: Deepak Kumar Shivanna Vokaliga, Hopkinton, MA (US); Michael Daniel Anthony, Wilmington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 172 days.

(21) Appl. No.: 16/697,544

(22) Filed: Nov. 27, 2019

(65) Prior Publication Data

US 2021/0157677 A1    May 27, 2021

(51) Int. Cl.
*G06F 11/14* (2006.01)

(52) U.S. Cl.
CPC ...... *G06F 11/1451* (2013.01); *G06F 2201/84* (2013.01)

(58) Field of Classification Search
CPC .......................... G06F 11/1451; G06F 2201/84
See application file for complete search history.

(56) References Cited

U.S. PATENT DOCUMENTS

| | | | | |
|---|---|---|---|---|
| 6,981,114 B1 * | 12/2005 | Wu | ............... | G06F 11/1469 714/E11.122 |
| 8,255,650 B1 * | 8/2012 | Gruttadauria | ....... | G06F 9/45558 711/170 |
| 9,727,264 B1 * | 8/2017 | Bushman | ............... | G06F 3/061 |
| 2008/0244205 A1 * | 10/2008 | Amano | ............... | G06F 11/1469 711/162 |
| 2010/0023716 A1 * | 1/2010 | Nemoto | ............... | G06F 3/065 711/E12.103 |
| 2012/0179655 A1 * | 7/2012 | Beatty | ............... | G06F 11/1469 707/646 |
| 2013/0132346 A1 * | 5/2013 | Varadarajan | ........ | G06F 11/1448 707/639 |
| 2017/0031772 A1 * | 2/2017 | Subramanian | ........ | G06F 16/128 |
| 2017/0235652 A1 * | 8/2017 | Natanzon | ............ | G06F 11/1453 714/6.3 |
| 2017/0357550 A1 * | 12/2017 | Jain | ............... | G06F 11/1451 |

OTHER PUBLICATIONS

United States U.S. Appl. No. 16/653,418, entitled "Multi-Policy Interleaved Snapshot Lineage", filed Oct. 15, 2019.

* cited by examiner

*Primary Examiner* — Tony Wu
(74) *Attorney, Agent, or Firm* — Ryan, Mason & Lewis, LLP

(57) ABSTRACT

Techniques are provided for incremental snapshot recovery from a remote storage system. One method comprises, in response to a request to restore a snapshot from a remote storage system: obtaining, from a local storage system, a first bitmap for the first snapshot indicating differences with respect to a previous snapshot, comparing the first bitmap to an allocation bitmap of an earliest maintained snapshot to obtain a baseline bitmap representing a baseline version of the first snapshot; recovering the baseline version of the first snapshot, using the baseline bitmap, from the remote storage system. The snapshots may be stored in the remote storage system in a time order, and following the recovery of the first snapshot, a user may move forward or backward in time along a lineage of snapshots by copying only the changed blocks of bitmaps between two desired points in time.

20 Claims, 10 Drawing Sheets

Snapshot Recovery Process 700

710: To Restore Snapshot S2:
Perform Bitwise OR Operation Between Bitmap B(0,1) and Bitmap B(1,2) and Resulting Bitmap Represents Baseline Full Snapshot S2;
Perform Full Recovery of Baseline Snapshot S2 Using Resulting Bitmap (for every set bit, perform write operation from Respective Snapshot S2 into a Recovery LUN (e.g., within Storage Array); and Store Last Recovered Snapshot (S2) in Recovery LUN.

720: Then, to Recover Snapshot S3 Back to Recovery LUN:
(obtain changes unique to Snapshot S3, relative to Full Snapshot S2):
Using Bitmap B(2,3), Perform Differential Recovery on Recovery LUN (take data for Snapshot S3 and Recover to Recovery LUN);
Store Recovered Snapshot (S3) in Recovery LUN.

730: Then, to Recover Snapshot S5 Back to Recovery LUN:
(Current Image on Recovery LUN is Snapshot S3):
Perform Bitwise OR of Bitmaps B(3,4) and B(4,5) to Obtain Changes Between Bitmap 3 and Bitmap 5; and
Perform Differential Recovery of Snapshot S5 on Recovery LUN.

740: Then, to Recover Snapshot S4 Back to Recovery LUN (e.g., back in timeline):
(Current Image on Recovery LUN is Snapshot S5 as Cumulative of Changes in Bitmaps 1-5):
To Go Back in Timeline, Reverse Some Write Operations from Snapshot S5 and Replace With Snapshot S4. Perform Bitwise OR of Bitmaps B(3,4) and B(4,5) to Obtain Representation on Snapshot S4 and then Perform Read Operation from Snapshot S4 from Remote Storage System 150 to Recovery LUN.

FIG. 7

INCREMENTAL SNAPSHOT RECOVERY FROM REMOTE STORAGE SYSTEM

FIELD

The field relates generally to information processing techniques, and more particularly, to techniques for information recovery.

BACKGROUND

As computing technology has advanced over time, so too has the amount and scope of data that is maintained and analyzed via computer systems. Data storage systems, such as those utilized in network-attached storage (NAS) platforms, provide the means by which these large sets of data can be maintained in an efficient and reliable way. In NAS platforms, and in other data storage systems, it is often desirable to maintain copies (e.g., snapshots) of data stored on the platform for backup, archival, and/or other purposes. These data snapshots can be stored locally by the NAS platform, or can be provided to a remote storage system (such as a cloud storage system) for longer-term retention.

A need remains for improved snapshot recovery techniques.

SUMMARY

In one embodiment, a method comprises, in response to a request to restore a first snapshot of a logical unit from a remote storage system: obtaining, from a local storage system, a first bitmap for the first snapshot indicating differences with respect to a previous snapshot of the logical unit, wherein an earliest maintained snapshot for the logical unit comprises a full snapshot having an allocation bitmap; comparing the first bitmap to the allocation bitmap to obtain a baseline bitmap representing a baseline version of the first snapshot; recovering the baseline version of the first snapshot, using the baseline bitmap, from the remote storage system; and storing the baseline version of the first snapshot as a last recovered snapshot with the baseline bitmap to a recovery logical unit in the local storage system.

In some embodiments, in response to a request to restore a second snapshot of the logical unit from the remote storage system, wherein a second bitmap for the second snapshot indicates differences with respect to a previous snapshot of the logical unit: obtaining the last recovered snapshot and the baseline bitmap from the local storage system; comparing the second bitmap for the second snapshot to the baseline bitmap for the last recovered snapshot to identify changes to the second snapshot relative to the last recovered snapshot; performing a differential recovery of the second snapshot, using the identified changes and the last recovered snapshot, from the remote storage system; and storing the second snapshot as the last recovered snapshot as a new baseline version to the recovery logical unit in the local storage system.

In at least one embodiment, the snapshots stored in the remote storage system are stored in a time order, and following the recovery of the first snapshot, further comprising moving forward or backward in time along a lineage of snapshots by copying only the changed blocks of bitmaps between two desired points in time.

Other illustrative embodiments include, without limitation, apparatus, systems, methods and computer program products comprising processor-readable storage media.

BRIEF DESCRIPTION OF THE DRAWINGS

FIG. 7 illustrates exemplary pseudo code for an incremental snapshot recovery process, according to one embodiment of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for incremental snapshot recovery from a remote storage system.

In one or more embodiments, incremental snapshot recovery techniques are provided that employ bitmaps for each snapshot indicating differences with respect to a prior snapshot. A given snapshot can later be recovered and restored using the bitmap corresponding to the given snapshot. In this manner, in at least some embodiments, the disclosed snapshot recovery process is differential in nature. Thus, for a first snapshot restoration, the disclosed snapshot recovery process would be a full restoration, for example, except for unallocated and zero tracks. The subsequent snapshot on the same logical unit would undergo a differential recovery.

One or more aspects of the invention recognize that the process of recovering a snapshot that was previously stored on the cloud can be expensive, as the egress of data from the cloud has an associated retrieval cost. Thus, some embodiments of the disclosure improve snapshot retrieval efficiency. At the same time, recovering snapshots back to the storage array has a storage cost to store the data on the storage array. Thus, efficient use of storage array space is also important to make the most of the storage resources. Most block-based snapshot restoration or recovery procedures involve bringing the entire snapshot back to the storage array.

Figure 1:
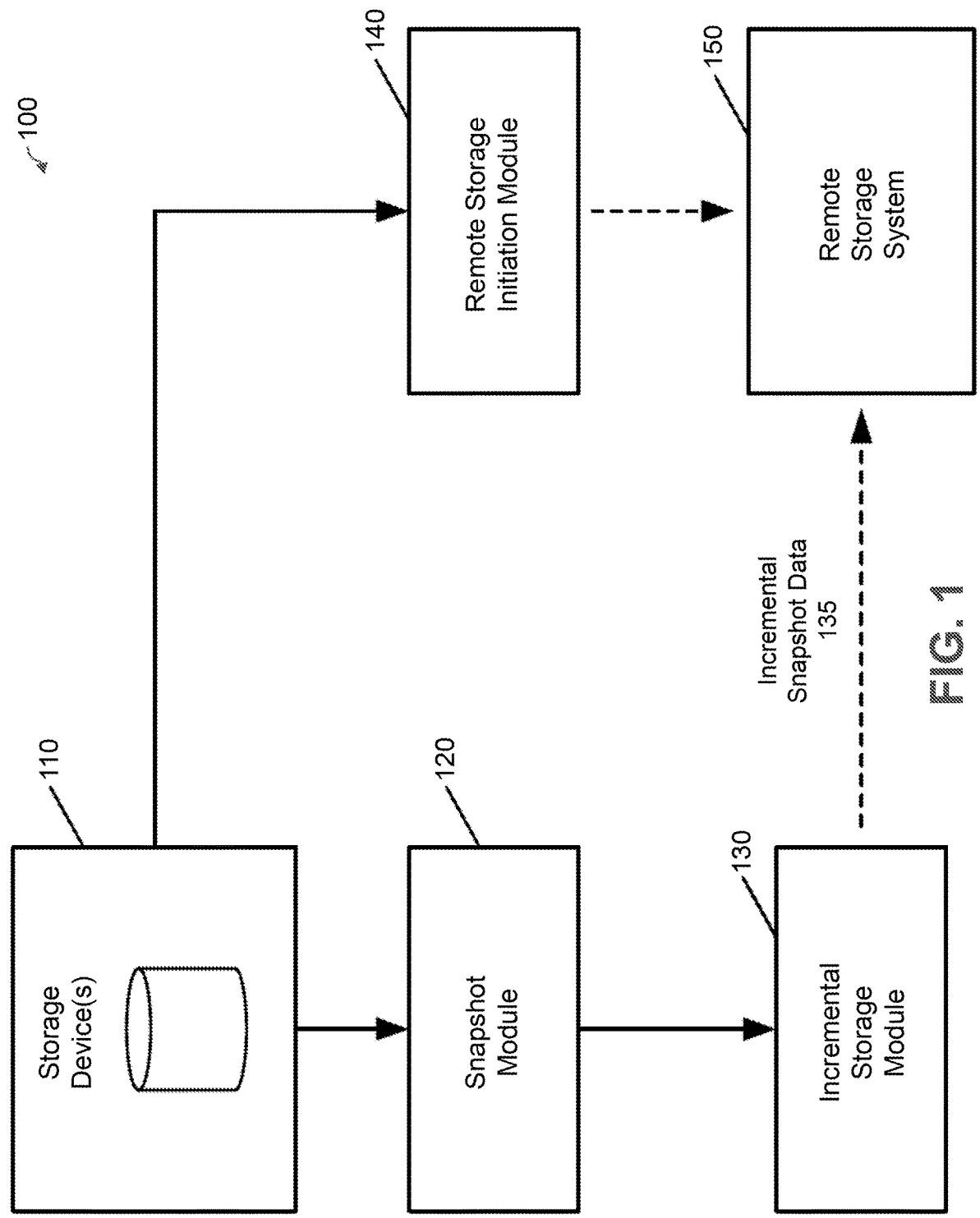
FIG. 1 illustrates a system for maintenance of incremental snapshots on a remote storage system, according to one embodiment of the disclosure.

FIG. 1 illustrates a system 100 that facilitates interleaved snapshot lineage in accordance with various embodiments described herein. As shown in FIG. 1, system 100 can include one or more storage devices 110. The storage devices 110 can be physical devices (e.g., hard disk drives, solid state drives, etc.) and/or virtual logical units (LUNs) associated with respective physical devices (collectively, referred to herein as logical units). In an aspect, a LUN can be structured independently of underlying physical media. For example, a physical drive or group of drives could be logically partitioned into a group of LUNs that could be managed separately from the physical drive(s). In another example, the storage devices 110 can be collections of physical devices, e.g., multiple drives arranged as a RAID array and/or in other suitable configurations.

As further shown in FIG. 1, system 100 can also include a remote storage initiation module 140 that can assign a virtual storage volume on a remote storage system 150, such as a cloud repository or the like, to respective data retention policies associated with one or more storage devices 110. It should be appreciated that a virtual storage volume as assigned or otherwise established by the remote storage initiation module 140 in this manner need not be a physical storage device located at the remote storage system 150. Rather, the remote storage initiation module 140 can establish a virtual storage volume at the remote storage system 150 as a virtual translation layer and/or a metadata object at the remote storage system 150, which can in turn be utilized as a passthrough device by system 100.

System 100 as shown in FIG. 1 additionally includes a snapshot module 120 that can generate data snapshots corresponding to respective ones of the storage devices 110 according to corresponding data retention policies, e.g., the data retention policies utilized by the remote storage initiation module 140 to establish storage objects for the respective storage devices 110 at the remote storage system 150. As used herein, a snapshot or data snapshot refers to a representation of the full contents of an underlying LUN or other storage device. For example, a data snapshot can include a full copy of the stored contents of an underlying device and/or a representation of those contents, e.g., an incremental representation of the data. Techniques by which full and/or incremental data snapshots can be generated are described below.

In at least some embodiments, a data retention policy as used by the snapshot module 120 can specify various aspects of the snapshotting to be performed by the snapshot module 120, e.g., snapshot generation frequency, and storage devices (e.g., LUNs) designated for snapshotting. In another variation, the snapshot module 120 can be associated with a storage array that includes the storage devices 110. Also, or alternatively, the snapshot module 120 can be implemented separately from respective storage devices 110 that are associated with the snapshot module 120.

In one or more embodiments, once a data snapshot for one or more storage devices 110 has been captured, the captured data snapshot can be stored by various means. For example, a data snapshot can be stored locally by one or more computing devices associated with system 100. Examples of techniques for storing and maintaining local snapshot data are described below. Also, or alternatively, snapshot data can be provided to the remote storage system 150 via a cloud tethering subsystem (CTS), which can include an incremental storage module 130 as shown in FIG. 1. In one aspect, the CTS, via the incremental storage module 130 and/or independently, can perform format conversions and/or other operations to prepare a data snapshot captured by the snapshot module 120 for communication to the remote storage system 150. For example, the CTS can obtain data snapshots that have been obtained by the snapshot module 120 in a block-based format and perform block-to-object translation and/or other suitable operations to convert the snapshots to an unstructured object language supported by the remote storage system 150. Also, or alternatively, the CTS can optionally perform other actions such as maintaining local records pertaining to the data snapshots located at the remote storage system 150, such as the disclosed bitmaps, and scheduling transfers between system 100 and the remote storage system 150.

In general, snapshots captured by the snapshot module 120 as taken on a timeline can be transferred to a heterogeneous cloud repository in object format. In one aspect, snapshot capturing and/or transferal can be performed on the bases of one or more policies that are set on a group of LUNs and/or other storage devices 110. Such a group is referred to herein as a storage group (SG). As noted above, these policies can define snapshot frequency, the retention period for respective snapshots, and/or the cloud provider where the relevant object repository is hosted. Snapshot frequency can be utilized to instruct the snapshot module 120 to create a snapshot against respective LUNs of an SG at a regular cadence, e.g., as defined by a system administrator or other user. The set of snapshots taken against an SG in this manner are referred to herein as "snapsets." The retention period can define the age at which a snapshot is deleted locally and/or at the remote storage system 150. The cloud provider can indicate to respective elements of system 100 the object repository where the snapshots are to be shipped. Together, these and/or other parameters define a data retention and/or cloud protection policy. By way of a specific, non-limiting example, a data retention policy could be specified, as follows: Frequency=30 days, Retention=1 year, Cloud Repository=XYZ_Object_Store. This example policy indicates that a snapset is taken every 30 days and retained at the cloud provider XYZ_Object_Store for one year.

In another embodiment, the snapshot module 120 can create snapshots for respective storage devices 110, e.g., storage devices on a storage array, for a given SG according to a schedule defined by a policy, resulting in a snapset. This snapset can then be marked for shipment to the remote storage system 150. The incremental storage module 130 can then scan for and/or otherwise locate snapsets that have been marked for shipment to the remote storage system 150 and transfer incremental representations of those snapshots to the remote storage system 150, e.g., to a designated virtual storage volume or other storage object at the remote storage system 150 as assigned by the remote storage initiation module 140.

In some embodiments, if a snapset processed by the incremental storage module 130 is a first snapset for a given storage device 110, e.g., no previous snapshots for the storage device 110 have been shipped to the remote storage system 150, the incremental storage module 130 can ship the snapset to the remote storage system 150 relative to an initial state of the storage object associated with the storage device 110 at the remote storage system 150. In other words, an initial snapshot for a given storage device 110 can be shipped as a substantially full snapshot, from which unallocated tracks of the storage device 110 and/or other snapshot data corresponding to portions of an underlying storage device 110 that contain no data can be omitted. Other processing steps can be performed by the incremental storage module 130 for an initial snapshot. For example, the incremental storage module 130 can utilize differential capabilities of a storage array associated with the respective storage devices 110. As an initial step, the incremental storage module 130 can request the snapshot differential (snap-diff) bitmaps associated with a given LUN or other storage device 110. For a first snapshot associated with a storage device 110, the array can return the allocation bitmap on the snapshot, which can then be utilized to increase the efficiency of the initial snapshot.

As further shown in FIG. 1, the incremental storage module 130 can transmit further incremental snapshot data 135, e.g., incremental representations of additional full data snapshots, to the remote storage system 150 for subsequent snapsets associated with the storage device 110. More particularly, subsequent to an initial snapshot, subsequent snapsets for the same SG can be differential in nature compared to the previously shipped snapsets. Accordingly, when the CTS requests shipment of a subsequent (Nth) snapset, the incremental storage module 130 can request the snap-diff between the Nth snapset and the (N−1)th snapset, which can in response be returned by the storage array. Using this process, the CTS can be configured to read only the portions of the LUN that are set in the bitmap for shipping to the remote storage system 150 as part of the snapshot. In some embodiments, the granularity of respective bits of the snap-diff bitmap can be a track that is of a uniform size (e.g., 128 kb.). Accordingly, the incremental storage module 130 can perform the shipping of incremental snapshots based on the bits that are set in the bitmap.

In one or more embodiments, the snapshot module 120, the incremental storage module 130 and/or the remote storage initiation module 140 can incorporate at least portions of the functionality of the CTS.

In one variation, a queueing component (not shown in FIG. 1) can be provided in the example of FIG. 1 to queue respective data snapshots that have been generated by the snapshot module 120 for one or more storage devices 110 pending transfer of the snapshots to the remote storage system 150 by the incremental storage module 130 as described above, and as further described, for example, in U.S. patent application Ser. No. 16/653,418, filed Oct. 15, 2019, entitled "Multi-Policy Interleaved Snapshot Lineage," incorporated by reference herein in its entirety. Generally, the exemplary queueing component may facilitate queuing of data snapshots pending data transfer to the remote storage system 150 in accordance with various aspects described herein.

In another variation that facilitates local retention of data snapshots in accordance with various aspects described herein, the incremental storage module 130 can ship data snapshots produced by a snapshot module 120 to a remote storage system 150 as described above with respect to FIG. 1. In addition, a local retention component (not shown in FIG. 1) can be provided to locally store respective snapshots generated by the snapshot module 120 (e.g., with the storage array of FIG. 1, as opposed to the remote storage system 150) according to a retention policy for a given storage device 110, in addition to or in place of shipping the snapshot to the remote storage system 150, as further described in U.S. patent application Ser. No. 16/653,418, incorporated by reference above.

In one embodiment, local snapshot storage as provided by the local retention component can be utilized for backup as well as other purposes. By way of example, the snapshot module 120 can be instructed to provide snapshots for a given storage device 110 at a frequency, e.g., daily, that is higher than the rate at which snapshots are shipped to the remote storage system 150. As a result, the system can recover from database corruption and/or other sources of data loss with only the loss of data since the previous daily backup snapshot. These snapshots can then be discarded at a given time, e.g., once the snapshots have reached a threshold age.

Figure 2:
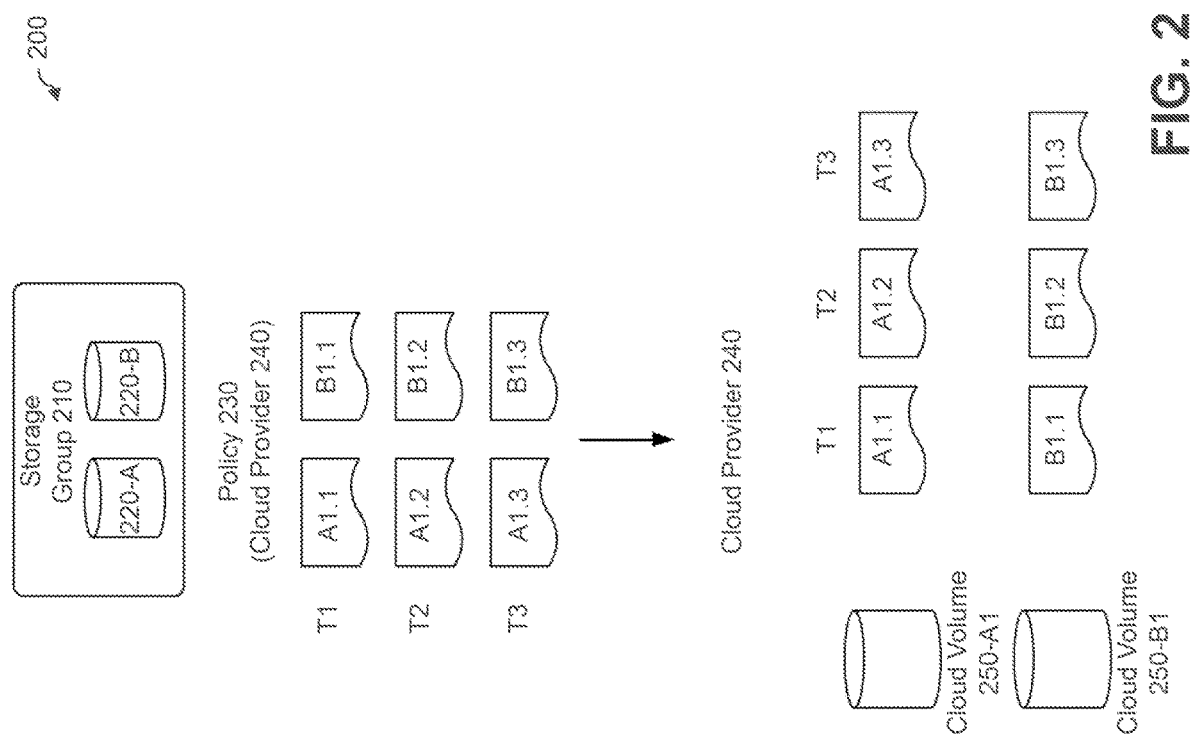
FIG. 2 illustrates an exemplary snapshot lineage that can be maintained according to some embodiments.

In another aspect, the local retention component can also be used to increase the efficiency of shipping snapshots to the remote storage system 150 by the incremental storage module 130. For example, the local retention component can store a first data snapshot for a given storage device 110 in response to that snapshot being shipped to the remote storage system 150. When a subsequent snapshot is generated for the storage device 110, the incremental storage module 130 can utilize the previous snapshot as stored by the local retention component to generate a differential between the current snapshot and the previous snapshot without incurring additional bandwidth for analyzing the snapshot as stored on the remote storage system 150. Once the differential has been generated and the current snapshot has been shipped incrementally to the remote storage system 150, the previous snapshot as stored by the local retention component can be discarded and replaced with the new snapshot, and the process as described herein can be repeated for another subsequent snapshot for the storage device 110. FIG. 2 illustrates an exemplary snapshot lineage 200 that can be maintained according to some embodiments of the disclosure. The example of FIG. 2 illustrates a snapshot lineage for a given SG that can be maintained via the remote storage initiation module 140 and the incremental storage module 130 of FIG. 1. As used herein, a snapshot lineage refers to the group of outstanding snapshots for a storage device and/or group of storage devices in chronological order. As illustrated in FIG. 2, a storage group 210, for example, with an identifier SG-UUID-1, contains two devices denoted 220-A and 220-B and is associated with a policy 230 to ship snapshots to cloud provider 240. As further shown in FIG. 2, snapshots are taken for devices 220-A and 220-B at times T1, T2 and T3. This series can be translated into a timeline of snapshots at the device level. As the snapshots are provided to the same cloud provider 240, the snapshots can be provided as a single lineage.

In an aspect, since snapshots A1.1 and B1.1 shown in FIG. 2 are the first snapshots for devices A and B, respectively, these snapshots can be provided as substantially full snapshots in the manner described above. As further shown in FIG. 2, snapshots A1.1 and B1.1, once transferred to the cloud provider 240, can be associated with cloud volume 250-A1 and cloud volume 250-B1, respectively. As described above with respect to FIG. 1, cloud volumes 250-A1 and 250-B1 can be virtual cloud volumes, also referred to in the art as cloud "buckets," that facilitate access by the original storage array to data associated with respective individual storage devices at that storage array.

To improve the efficiency of subsequent snapshots, the incremental storage module 130 can track differences between snapshots A1.2 and B1.2 taken at time T2 and snapshots A1.1 and B1.1 taken at time T1 such that an incremental representation of snapshots A1.2 and B1.2, rather than the full snapshots A1.2 and B1.2, can be provided to the cloud provider 240. Similarly, the incremental storage module 130 can track changes from the snapshots taken at times T2 and T3 and provide an incremental representation of snapshots A1.3 and B1.3 taken at time T3 to the cloud provider 240.

Returning to FIG. 1, the process of shipping snapshots to a remote storage system 150, especially a remote storage system associated with a public cloud platform, can be significantly expensive due to utilization of bandwidth on the public domain to reach the cloud platform. Further, these costs can be exacerbated in many cases if the associated cloud provider facilitates dedicated fiber lines at a premium. For these reasons, it is desirable that system 100 is efficient in shipping snapshots to the remote storage system 150. However, complications can arise in maintaining a snapshot lineage in cases where a device is part of multiple SGs and has multiple snapsets belonging to different policies at a given time.

As noted above, a storage device 110 can be part of multiple SGs and/or other consistency groups. Additionally, each of these SGs can have its own cloud protection policy that defines snapshot frequency and cloud retention length. In such an environment, the snapshot module 120 and incremental storage module 130 can facilitate creating snapshots for the device per the policies on each SG to which the device belongs. For example, if a device belongs to two SGs, the policies on those SGs could have different snapshot frequencies, resulting in snapshots being sent to the remote storage system 150 according to both policies.

In an aspect, system 100 can improve the efficiency of transferring snapshots to the remote storage system 150 by creating a snapshot lineage for a given storage device 110 irrespective of the SGs to which that storage device 110 belongs and their associated policies. By way of example, for a storage device 110 belonging to two distinct SGs, the remote storage initiation module 140 can define a single cloud volume for the storage device 110 at the remote storage system 150 for both SGs to which the storage device 110 belongs, as well as their corresponding data retention policies. Subsequently, the snapshot module 120 can generate a first data snapshot of a storage device 110 at a first time according to a first data retention policy for the first SG as well as a second data snapshot of the storage device 110 at a second time according to a second data retention policy for the second SG. "Distinct" in this context refers to SGs having different policies and is not related to the storage devices 110 that make up the SGs. For example, distinct SGs could have all, some, or no storage devices 110 in common provided that they operate according to different policies. In response to the snapshots being generated, the incremental storage module 130 can transfer incremental representations of the respective snapshots to the cloud volume created at the remote storage system 150 for the storage device 110.

By performing the actions described above and/or other suitable operations, system 100 can create a snapshot lineage for a storage device 110 in chronological order irrespective of the SGs associated with that storage device 110, the specific policies associated with those SGs, and/or the number of SGs associated with the storage device 110. In an aspect, the incremental storage module 130 can ship snapshots in the order presented to it, resulting in improved bandwidth efficiency by enabling differential calculations associated with the snapshots to be performed at a more granular level. When snapshot lineages are created beyond the boundaries of an SG and its associated policy, system 100 can nonetheless process the respective snapshots from a chronological sense, enabling differential data to be obtained between two snapshots at tighter intervals, resulting in a lesser change rate.

In another aspect, by associating all snapshots associated with a given storage device 110 to a single data structure at the remote storage system 150 regardless of the number of SGs associated with that device, the amount of redundant data transmitted to the remote storage system 150 that are associated with multiple SGs and/or corresponding policies to which the storage device 110 belongs can be reduced or eliminated.

Figure 3:
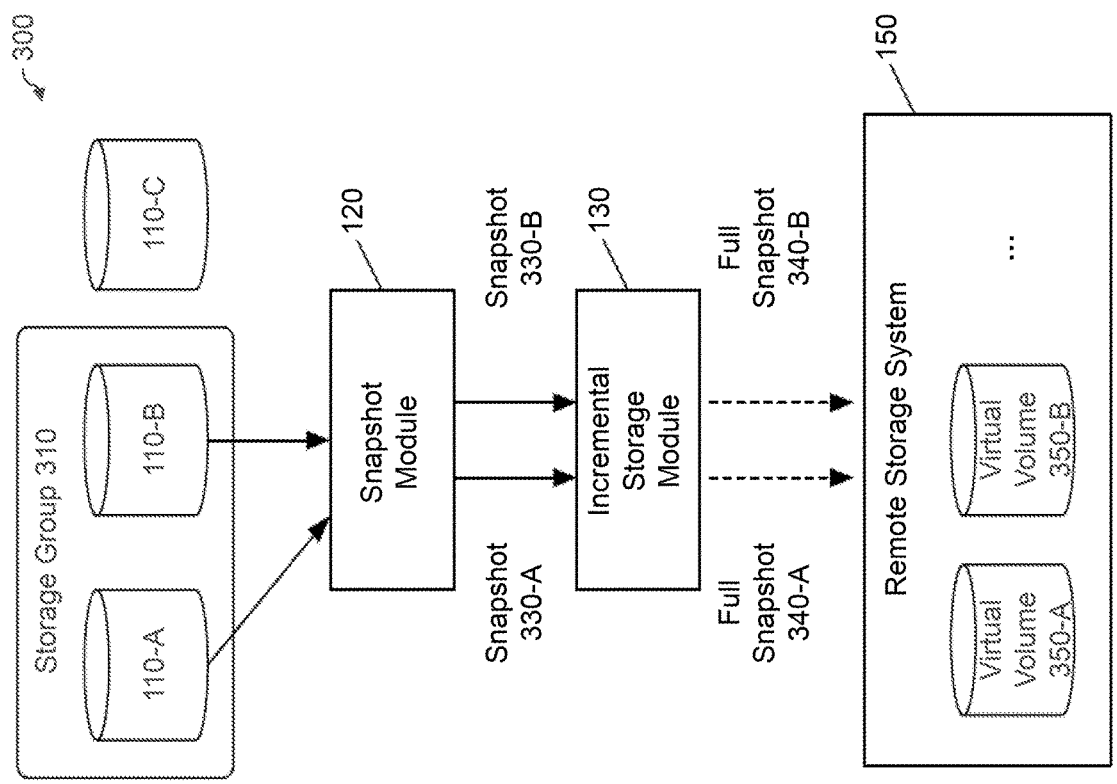
FIGS. 3 and 4 illustrate a remote storage volume initiation and maintenance environment for a group of storage devices, according to an embodiment of the disclosure.
Figure 4:
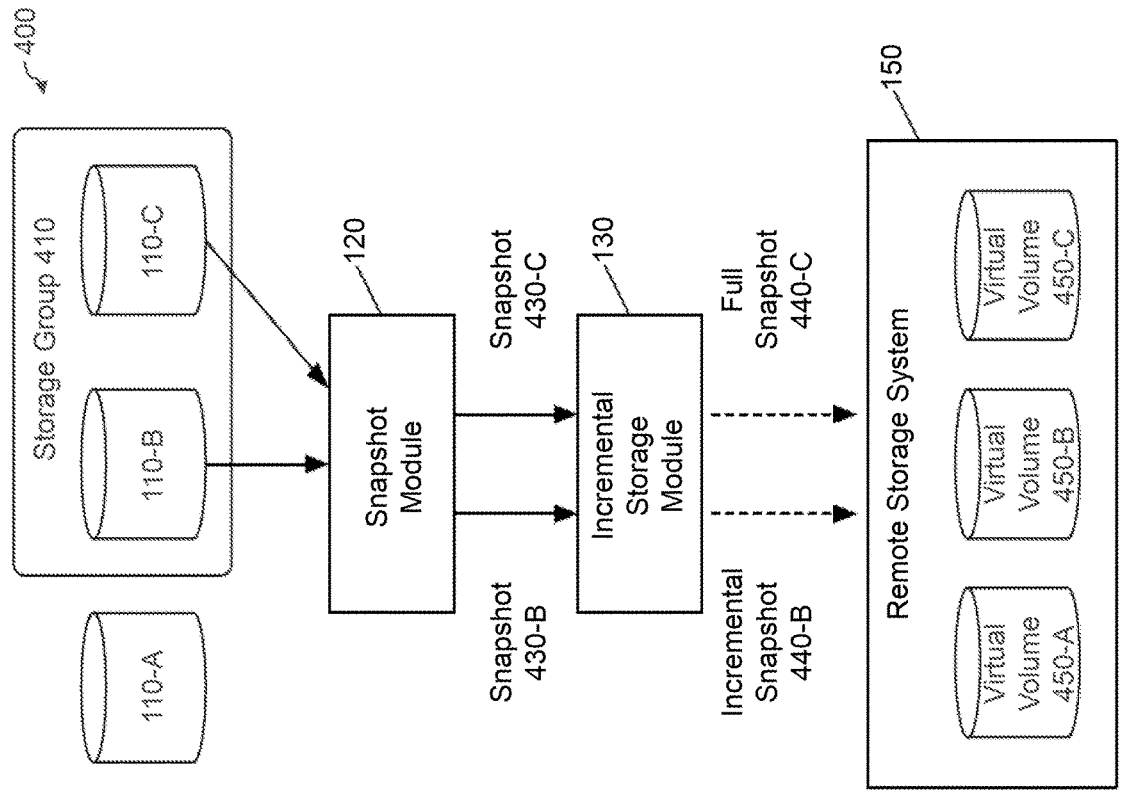

FIGS. 3 and 4 illustrate a remote storage volume initiation and maintenance environment 300, 400, respectively, for a group of storage devices, according to an embodiment of the disclosure. Repetitive description of like elements employed in other embodiments described herein is omitted for brevity.

In an aspect, FIGS. 3 and 4 illustrate respective operations that can be performed for an example system of three storage devices 110-A, 110-B, 110-C that belong to respective non-overlapping SGs. With reference first to FIG. 3, the snapshot module 120 can generate data snapshots for the storage devices 110-A, 110-B that belong to a first SG 310. Thus, as FIG. 3 illustrates, the snapshot module 120 can generate a first data snapshot 330-A for storage device 110-A and a second data snapshot 330-B for storage device 110-B at a first time, e.g., a time T1, according to a data retention policy that is associated with SG 310. Since no previous data snapshots exist for devices 110-A or 110-B at the remote storage system 150 at this time, both of the data snapshots can be transferred to respective virtual storage volumes 350-A and 350-B at the remote storage system 150 by the incremental storage module 130 relative to an initial state of those virtual storage volumes 350-A and 350-B, e.g., as substantially full snapshots 340-A and 340-B. While not shown in FIG. 3 for ease of illustration, the virtual storage volumes 350-A and 350-B can be created by a remote storage initiation module 140 and/or other suitable components upon establishment of the data retention policy for SG 310 and/or at another suitable time prior to snapshots being sent to the remote storage system 150.

Subsequently, as shown by FIG. 4, the snapshot module 120 can generate snapshots for a second SG 410 that includes storage devices 110-B and 110-C. More particularly, the snapshot module 120 can generate a third data snapshot 430-B of storage device 110-B and a fourth data snapshot 430-C of storage device 110-C at a second time, e.g., a time T2, according to a data retention policy that is associated with SG 410. Since no previous data snapshot exists for storage device 110-C at the remote storage system 150 at this time, the fourth data snapshot 430-C generated for storage device 110-C can be transferred to a virtual storage volume 450-C at the remote storage system 150 by the incremental storage module 130 relative to an initial state of the virtual storage volume 110-C, e.g., as a substantially full snapshot 440-C. Additionally, because a data snapshot was previously generated for storage device 110-B for the policy associated with SG 410 as shown in FIG. 4, the third data snapshot 430-B generated for storage device 110-B can be transferred by the incremental storage module 130 relative to the previous snapshot for storage device 110-B as an incremental snapshots 440-B without transferring the full snapshot. In a similar manner to that described above with respect to FIG. 3, it should be appreciated that the virtual storage volume 450-C shown in FIG. 4 can be created by a remote storage initiation module 140 and/or other suitable components upon establishment of the data retention policy for SG 410 and/or at another suitable time prior to snapshots being sent to the remote storage system 150.

As similarly noted above with respect to FIG. 1, it should be appreciated that while the virtual storage volumes 110-A through 110-C shown in FIGS. 3-4 can be physical storage volumes maintained by the remote storage system 150, the virtual storage volumes 450-A through 450-C need not be physical devices and can instead be data structures and/or other logical configurations of data that are maintained by the remote storage system 150. These data structures or other logical data configurations could then subsequently be accessed by system 400 as if they were physical volumes associated with their corresponding local storage devices 110-A through 110-C, and/or in any other suitable manner.

Figure 5:
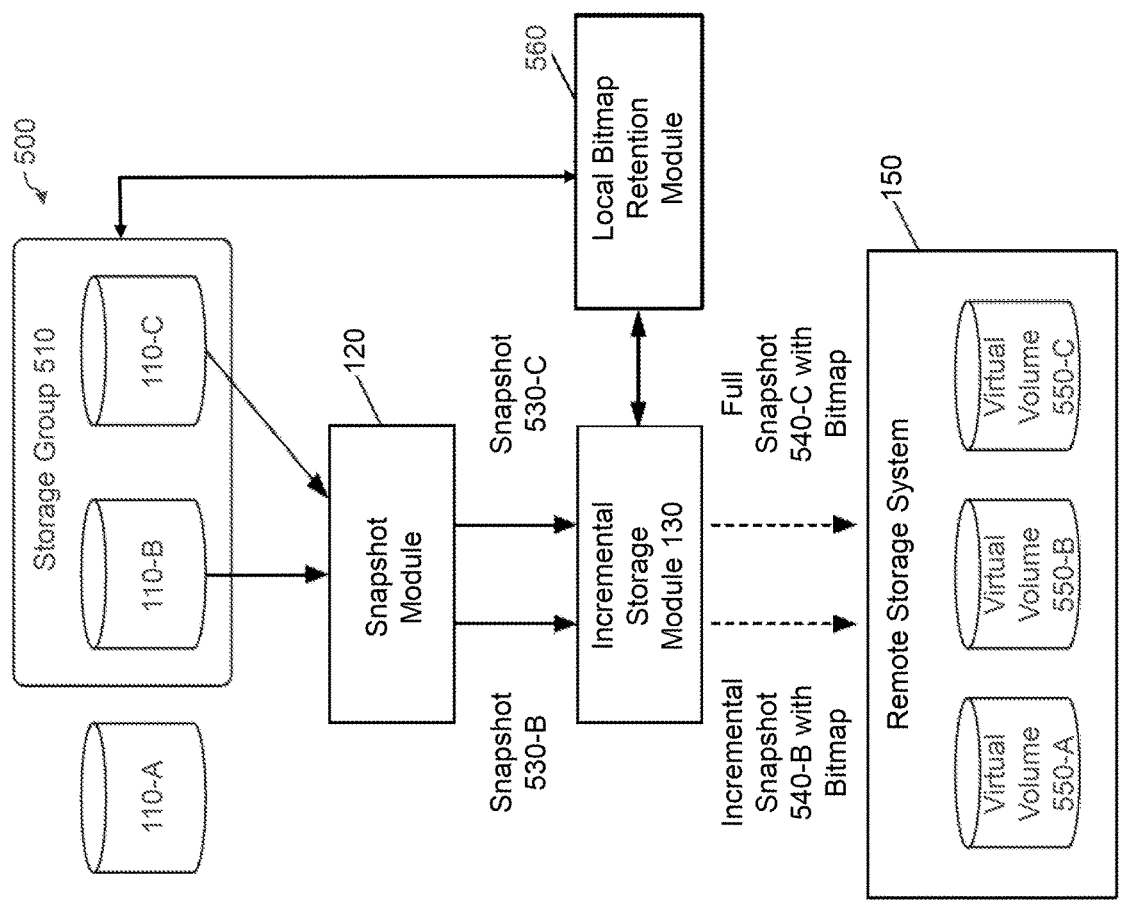
FIG. 5 illustrates a remote storage volume initiation and maintenance environment for a group of storage devices using bitmaps indicating differences between subsequent snapshots for storage with the snapshots, according to an embodiment of the disclosure.

FIG. 5 illustrates a remote storage volume initiation and maintenance environment 500 for a group of storage devices using bitmaps indicating differences between subsequent snapshots for storage with the snapshots, according to an embodiment of the disclosure. As shown in FIG. 5, the snapshot module 120 can generate snapshots for a SG 510 that includes storage devices 110-B and 110-C. More particularly, the snapshot module 120 can generate a data snapshot 530-B of storage device 110-B and a data snapshot 530-C of storage device 110-C at a second time, e.g., a time T2, according to a data retention policy that is associated with SG 510. Since no previous data snapshot exists for storage device 110-C at the remote storage system 150 at this time, the data snapshot 530-C generated for storage device 550-C can be transferred to a virtual storage volume 110-C at the remote storage system 150 by the incremental storage module 130 relative to an initial state of the virtual storage volume 550-C, e.g., as a substantially full snapshot 540-C with a bitmap indicating differences between subsequent snapshots for storage with the snapshot 540-C. The bitmaps can be created by a local bitmap retention module 560.

Additionally, because a data snapshot was previously generated for storage device 110-B for the policy associated with SG 510 as shown in FIG. 5, the data snapshot 530-B generated for storage device 110-B can be transferred by the incremental storage module 130 relative to the previous snapshot for storage device 110-B as an incremental snapshots 540-B, with a corresponding bitmap, without transferring the full snapshot. In a similar manner to that described above with respect to FIGS. 3 and 4, it should be appreciated that the virtual storage volumes 550-A through 550-C shown in FIG. 5 can be created by a remote storage initiation module 140 and/or other suitable components upon establishment of the data retention policy for SG 510 and/or at another suitable time prior to snapshots being sent to the remote storage system 150.

Thus, as part of the procedure of providing snapshots to the remote storage system 150, the bitmaps tracking the differentials are stored with the corresponding snapshot 540. The first snapshot for a LUN which is sent to the remote storage system 150 stores the allocation bitmap. The subsequent snapshot will store the difference between itself (e.g., snapshot N) and the previous snapshot (e.g., snapshot N−1).

Figure 6:
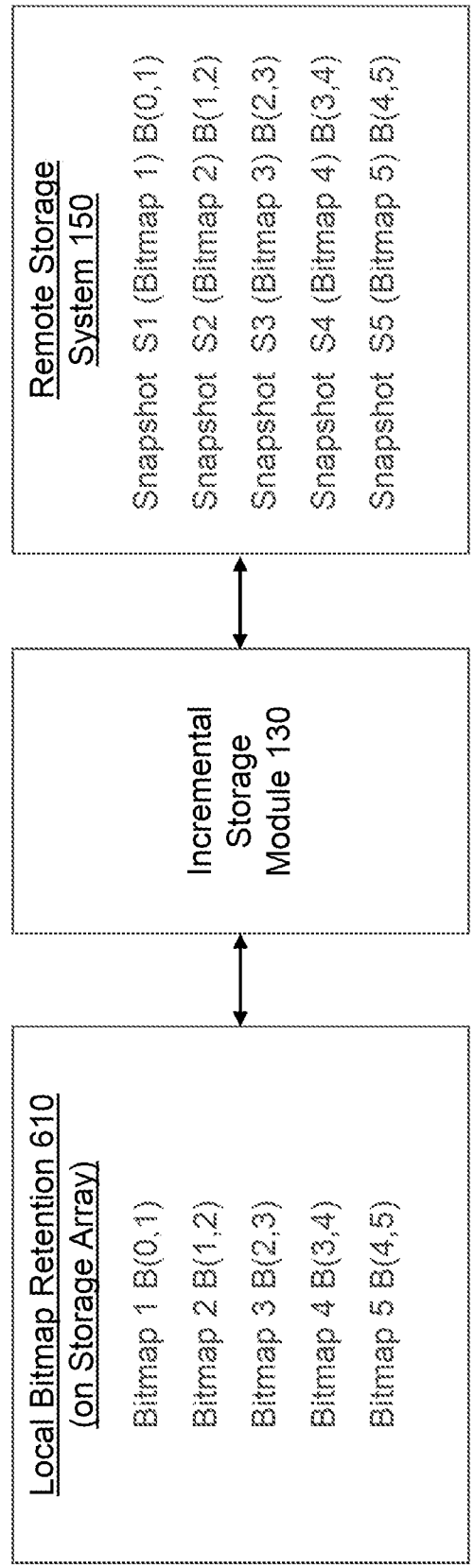
FIG. 6 illustrates the storage of snapshots with the bitmaps on the remote storage system 150 of FIG. 1, according to one or more embodiments.

FIG. 6 illustrates the storage of snapshots 600 with the bitmaps locally with the storage array comprising storage devices 110 and on the remote storage system 150 of FIG. 1 by the incremental storage module 130 of FIG. 1, according to one or more embodiments. FIG. 6 provides an example for the storage of snapshots and corresponding bitmaps for a first LUN. As shown in FIG. 6, a local bitmap retention storage 610 is maintained with the storage array.

Assume that Snapshots S1, S2, S3 are being shipped from the storage array to the remote storage system 150 for the first LUN. In addition, the bitmaps discussed hereinafter are stored locally with the storage array in the local bitmap retention storage 610 by the local bitmap retention module 560 and/or the incremental storage module 130 of FIG. 5, for example.

On the remote storage system 150, the snapshots for the first LUN are stored, as follows:
Snapshot S1 (Bitmap 1) B(0,1)
Snapshot S2 (Bitmap 2) B(1,2)
Snapshot S3 (Bitmap 3) B(2,3)
Snapshot S4 (Bitmap 4) B(3,4)
Snapshot S5 (Bitmap 5) B(4,5),
where Bitmap 1 is the allocation bitmap represented by snapshot S1. Thus, Bitmap 2 tracks the differences between the bitmap for snapshot S1 and the bitmap for snapshot S2. Likewise, Bitmap 3 tracks the differences between the bitmap for snapshot S2 and the bitmap for snapshot S3, and so on.

FIG. 7 illustrates exemplary pseudo code for an incremental snapshot recovery process 700, according to one embodiment of the disclosure. In the example of FIG. 7, once the snapshots are shipped to the remote storage system 150 with the bitmap metadata (e.g., Bitmap 1), the following recovery by the incremental snapshot recovery process 700 will work as follows:

During step 710, the user wants to first restore snapshot S2, using the following steps:
   a. Perform a bitwise OR operation between bitmaps B(0,1) and B(1,2) and the resulting bitmap would be used to represent the baseline full snapshot S2.
   b. Then, a full recovery of the baseline snapshot S2 is performed using the result from step 710(*a*). Thus, for every set bit, a write operation is performed from the respective snapshot S2 into a recovery LUN (within the array).
   c. As part of the recovery process, the last recovered snapshot (e.g., snapshot S2) is kept in memory.

During step 720, the user wants to recover snapshot S3 back to the recovery LUN:
   d. At this time, a full copy of snapshot S2 has been placed on the recovery LUN. Thus, only changes that are unique on snapshot S3 are needed, as represented by Bitmap 3 B(2,3).
   e. Using Bitmap 3, a differential recovery is performed on the recovery LUN, using the data for snapshot S3 and recover that on to the recovery LUN on the array.

During step 730, the user wants to recover snapshot S5 to the recovery LUN:
   f. The current image on the recovery LUN is snapshot S3. To obtain the snapshot S5 image, a bitwise OR is performed of Bitmap 4 B(3,4) and Bitmap 5 B(4,5), which provides the changes between Bitmap 3 and Bitmap 5, and a differential recovery is performed of snapshot S5 on the recovery LUN.

During step 740, the user wants to recover snapshot S4 to the recovery LUN:
   g. The current image on the recovery LUN is snapshot S5, which is a cumulative set of all bitmaps (e.g., encompassing all of the changes). The user is now requesting to go back in timeline (e.g., a reversal of some of the write operations from snapshot S5 and replace them with snapshot S4), as follows:
     Perform a bitwise OR of the bitmaps B(3,4) and B(4,5) to obtain the representation on snapshot S4 and then perform the read operation from snapshot S4 from the remote storage system 150 (e.g., the cloud).

Figure 8:
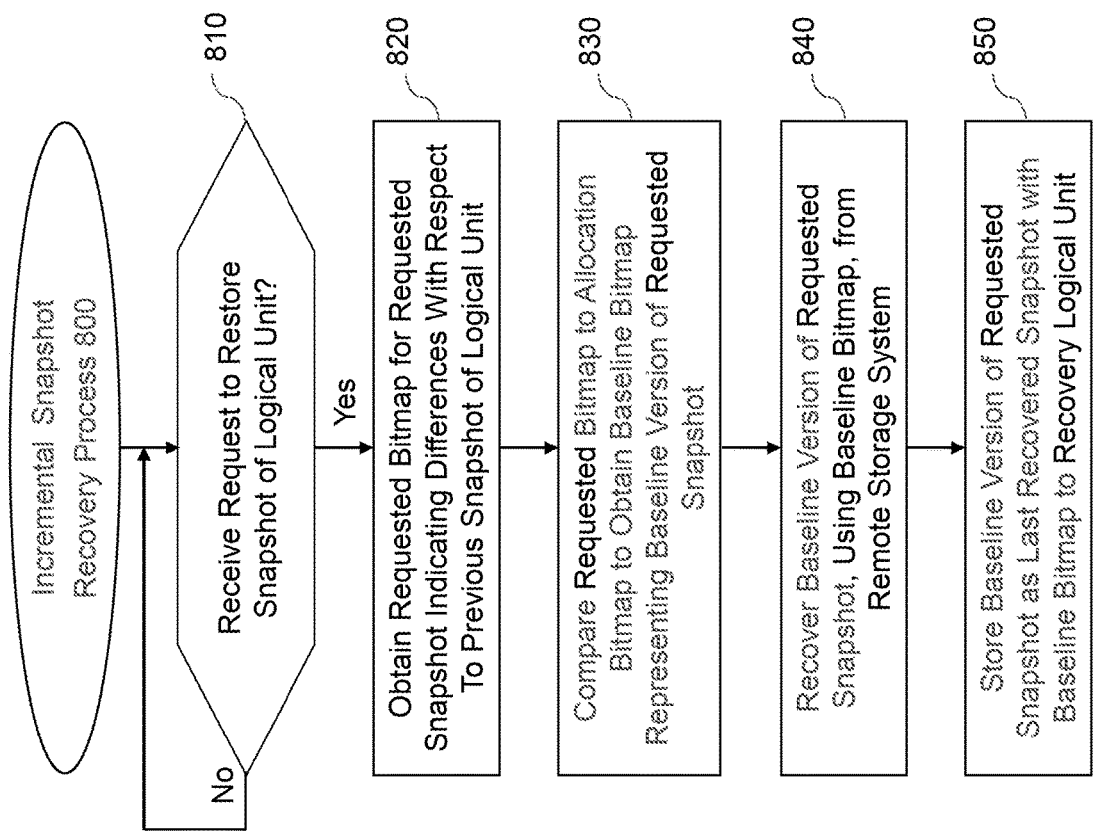
FIG. 8 is a flow chart illustrating an exemplary implementation of an incremental snapshot recovery process, according to some embodiments of the disclosure.

FIG. 8 is a flow chart illustrating an exemplary implementation of an incremental snapshot recovery process 800, according to some embodiments of the disclosure. As shown in FIG. 8, the exemplary incremental snapshot recovery process 800 initially performs a test in step 810 to determine if a request is received to restore a snapshot of a logical unit (e.g., from a remote storage system). Once it is determined during step 810 that a request to restore a snapshot has been received, the bitmap corresponding to the requested snapshot indicating differences with respect to a previous snapshot of the logical unit is obtained during step 820.

The requested bitmap is compared to the allocation bitmap during step 830 to obtain a baseline bitmap representing a baseline version of the requested snapshot. The baseline version of the requested snapshot is recovered during step 840, using the baseline bitmap, from the remote storage system.

The baseline version of the requested snapshot is stored during step 850 as a last recovered snapshot with the baseline bitmap to a recovery logical unit in the local storage system.

Thereafter, in response to a request to restore a second snapshot of the logical unit from the remote storage system (where a second bitmap for the second snapshot indicates differences with respect to a previous snapshot of the logical unit), the incremental snapshot recovery process 800 performs the following steps, in some embodiments:

obtain the last recovered snapshot and the baseline bitmap from the local storage system;

compare the second bitmap for the second snapshot to the baseline bitmap for the last recovered snapshot to identify changes to the second snapshot relative to the last recovered snapshot;

perform a differential recovery of the second snapshot, using the identified changes and the last recovered snapshot, from the remote storage system; and store the second snapshot as the last recovered snapshot and as a new baseline version to the recovery logical unit in the local storage system.

In some embodiments, the baseline version is maintained and provides an indication of which was the last snapshot that was recovered (and the corresponding bitmap).

Among other benefits, since the snapshots are time ordered in the remote storage system 150, once the first snapshot has been recovered, a user can move forward or backward in time anywhere in the timeline (or lineage) of snapshots by copying only the changed blocks resulting from applying an aggregation function (e.g., the bitwise OR operations) to all bitmaps between the two corresponding points in time. This process can continue by repeating this operation any number of times, as desired.

In some embodiments, the disclosed techniques for incremental snapshot recovery from a remote storage system improve the efficiency of snapshot recovery operations and allow a user to go forward or backward in time once an initial snapshot has been restored.

One or more embodiments of the disclosure provide improved methods, apparatus and computer program products for incremental snapshot recovery from a remote storage system. The foregoing applications and associated embodiments should be considered as illustrative only, and numerous other embodiments can be configured using the techniques disclosed herein, in a wide variety of different applications.

It should also be understood that the disclosed incremental snapshot recovery techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for incremental snapshot recovery may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as an incremental snapshot recovery engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based incremental snapshot recovery platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. These platforms may also be used to implement at least portions of other information processing systems in other embodiments.

Figure 9:
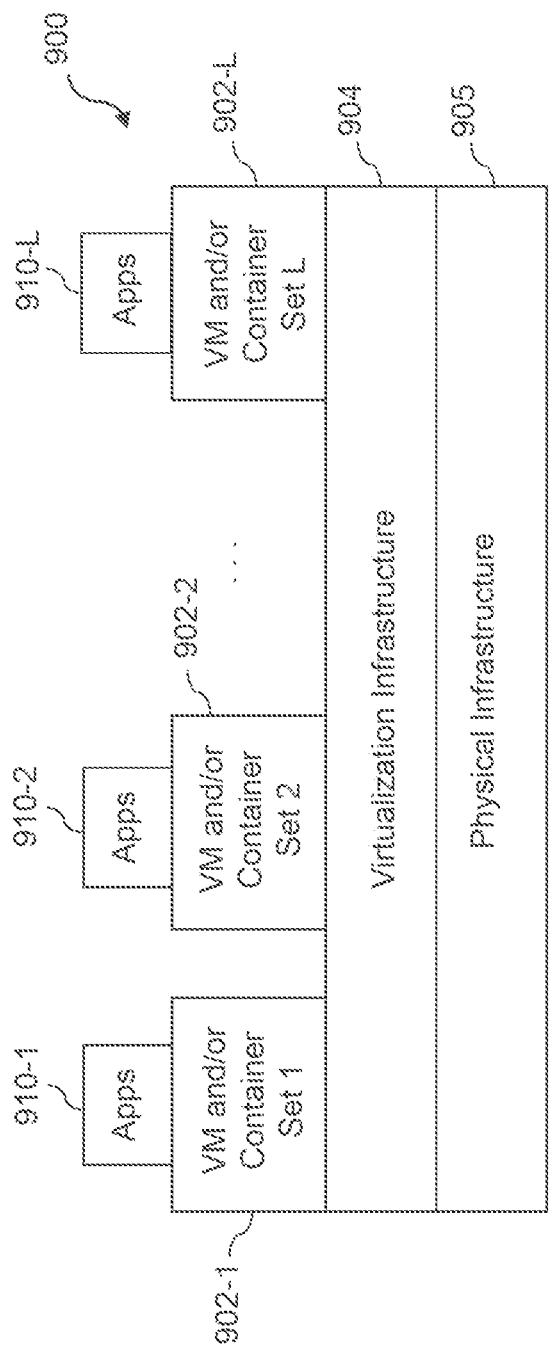
FIG. 9 illustrates an exemplary processing platform that may be used to implement at least a portion of one or more embodiments of the disclosure comprising a cloud infrastructure.

FIG. 9 shows an example processing platform comprising cloud infrastructure 900. The cloud infrastructure 900 comprises a combination of physical and virtual processing resources that may be utilized to implement at least a portion of an information processing system. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide incremental snapshot recovery functionality of the type described above for one or more processes running on a given one of the VMs. For example, each of the VMs can implement incremental snapshot recovery control logic and associated differential snapshot processing techniques for providing incremental snapshot recovery functionality for one or more processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide incremental snapshot recovery functionality of the type described above for one or more processes running on different ones of the containers. For example, a container host device supporting multiple containers of one or more container sets can implement one or more instances of incremental snapshot recovery control logic and associated differential snapshot processing techniques for use in incremental snapshot recovery.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises at least a portion of the given system and includes a plurality of processing devices, denoted 1002-1, 1002-2, 1002-3, . . . 1002-K, which communicate with one another over a network 1004. The network 1004 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an application specific integrated circuit (ASIC), a field programmable gate array (FPGA) or other type of processing circuitry, as well as portions or combinations of such circuitry elements, and the memory 1012, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Figure 10:
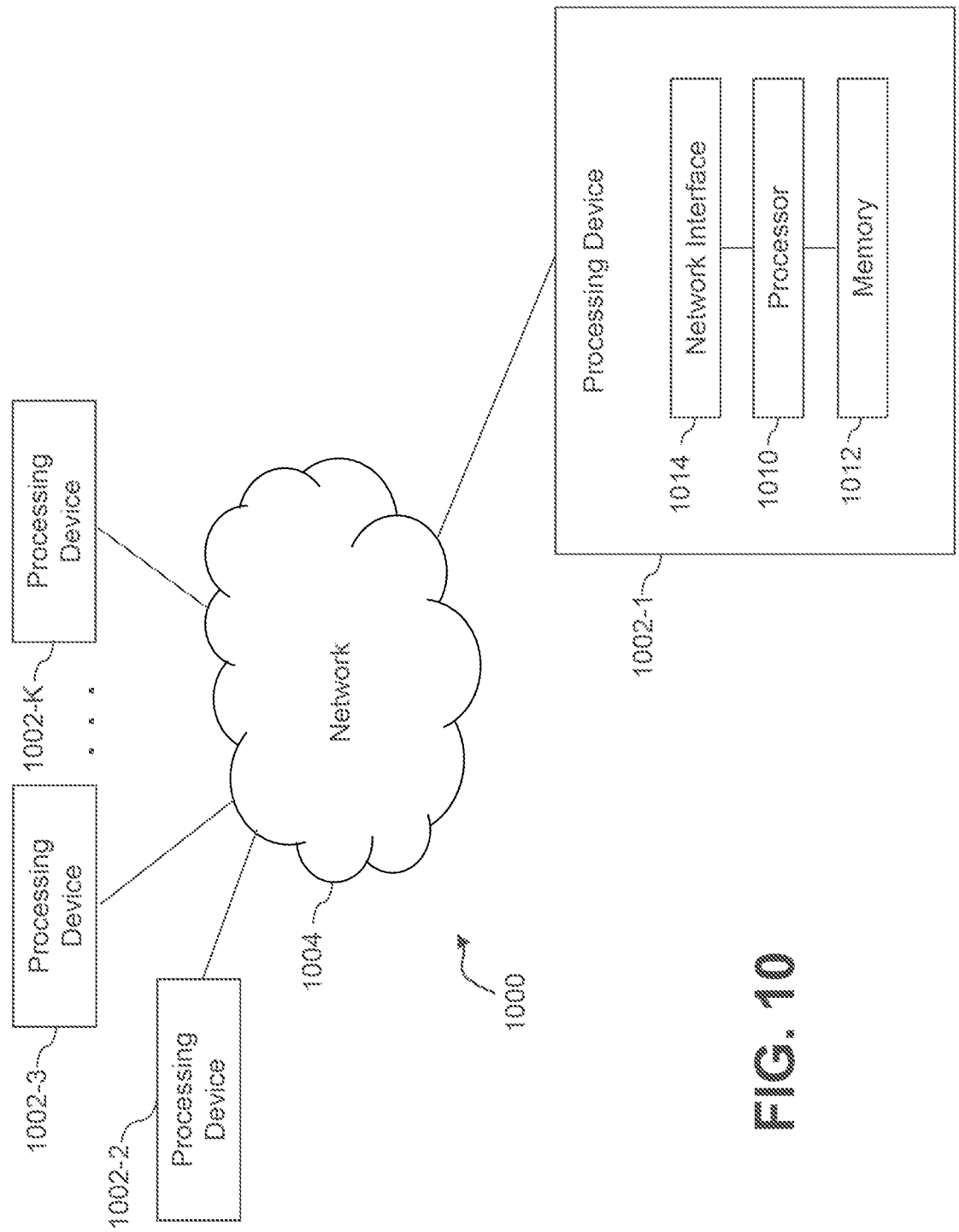
FIG. 10 illustrates another exemplary processing platform that may be used to implement at least a portion of one or more embodiments of the disclosure.

Multiple elements of an information processing system may be collectively implemented on a common processing platform of the type shown in FIG. 9 or 10, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
in response to a request to restore a first snapshot of a logical unit from a remote storage system to a local storage system, wherein the local storage system is remote from the remote storage system:
obtaining, from the local storage system, a first bitmap for the first snapshot to be restored, wherein the first bitmap indicates differences with respect to a previous snapshot of the logical unit, wherein an earliest maintained snapshot for the logical unit comprises a full snapshot having an allocation bitmap, wherein the allocation bitmap was created prior to receiving the request to restore the first snapshot;
comparing, by at least one processing device associated with the local storage system, the first bitmap to the allocation bitmap associated with the full snapshot to obtain a baseline bitmap representing a baseline version of the first snapshot to be restored;
recovering, by the at least one processing device associated with the local storage system, the baseline version of the first snapshot to be restored, using the baseline bitmap, from the remote storage system to the local storage system, wherein a plurality of snapshots stored in the remote storage system are stored in a time order and wherein the plurality of snapshots stored in the time order are configured to be traversed in a forward direction and a backward direction in time;
storing the baseline version of the first snapshot to be restored as a last recovered snapshot with the baseline bitmap to a recovery logical unit in the local storage system; and
following the storing the baseline version of the first snapshot in the recovery logical unit in the local storage system, (i) traversing at least one of forward and backward in time along a lineage of snapshots to recover a second snapshot from the remote storage system to the local storage system, wherein the second snapshot is non-consecutive with the first snapshot, by determining one or more changed blocks of the second snapshot, relative to the first non-consecutive snapshot, wherein the one or more changed blocks of the second snapshot are determined by applying an aggregation function to a plurality of bitmaps between the first snapshot and the second snapshot, and wherein the plurality of bitmaps between the first snapshot and the second snapshot comprise a plurality of bits identifying differences with respect to a corresponding snapshot, (ii) performing a differential recovery of the second snapshot from the remote storage system to the local storage system by: (a) copying the determined one or more changed blocks of the second snapshot, relative to the first non-consecutive snapshot, from the remote storage system and (b) using the first snapshot in the local storage system, and (iii) storing the recovered second snapshot in the recovery logical unit in the local storage system;
wherein the method is performed by at least one processing device comprising a processor coupled to a memory.

2. The method of claim 1, wherein the comparing comprises performing a bitwise OR operation between the first bitmap and the allocation bitmap.

3. The method of claim 1, further comprising, in response to a request to restore a second snapshot of the logical unit from the remote storage system, wherein a second bitmap for the second snapshot indicates differences with respect to a previous snapshot of the logical unit:
obtaining the last recovered snapshot and the baseline bitmap from the local storage system;
comparing the second bitmap for the second snapshot to the baseline bitmap for the last recovered snapshot to identify changes to the second snapshot relative to the last recovered snapshot;
performing a differential recovery of the second snapshot, using the identified changes and the last recovered snapshot, from the remote storage system; and
storing the second snapshot as the last recovered snapshot as a new baseline version to the recovery logical unit in the local storage system.

4. The method of claim 1, wherein a snapshotting module in the local storage system generates the first snapshot according to a predefined data retention policy and wherein an incremental storage module transfers an incremental representation of the first snapshot, relative to the previous snapshot, to the remote storage system.

5. The method of claim 1, wherein at least a portion of the remote storage system comprises a cloud-based storage system.

6. The method of claim 3, wherein the comparing comprises performing a bitwise OR operation between the second bitmap and the baseline bitmap.

7. The method of claim 3, wherein, when the second snapshot is after the last recovered snapshot, the differential recovery of the second snapshot comprises reversing one or more write operations associated with the last recovered snapshot.

8. The method of claim 7, wherein the reversing the one or more write operations associated with the last recovered snapshot comprises performing bitwise OR operations between each subsequent pair of bitmaps between the last recovered snapshot and the second snapshot to obtain a representation of the second snapshot and then performing one or more read operations from the second snapshot from the remote storage system to the recovery logical unit.

9. An apparatus comprising:
at least one processing device comprising a processor coupled to a memory;

the at least one processing device being configured to implement the following steps:

in response to a request to restore a first snapshot of a logical unit from a remote storage system to a local storage system, wherein the local storage system is remote from the remote storage system:

obtaining, from the local storage system, a first bitmap for the first snapshot to be restored, wherein the first bitmap indicates differences with respect to a previous snapshot of the logical unit, wherein an earliest maintained snapshot for the logical unit comprises a full snapshot having an allocation bitmap, wherein the allocation bitmap was created prior to receiving the request to restore the first snapshot;

comparing, by at least one processing device associated with the local storage system, the first bitmap to the allocation bitmap associated with the full snapshot to obtain a baseline bitmap representing a baseline version of the first snapshot to be restored;

recovering, by the at least one processing device associated with the local storage system, the baseline version of the first snapshot to be restored, using the baseline bitmap, from the remote storage system to the local storage system, wherein a plurality of snapshots stored in the remote storage system are stored in a time order and wherein the plurality of snapshots stored in the time order are configured to be traversed in a forward direction and a backward direction in time;

storing the baseline version of the first snapshot to be restored as a last recovered snapshot with the baseline bitmap to a recovery logical unit in the local storage system; and following the storing the baseline version of the first snapshot in the recovery logical unit in the local storage system, (i) traversing at least one of forward and backward in time along a lineage of snapshots to recover a second snapshot from the remote storage system to the local storage system, wherein the second snapshot is non-consecutive with the first snapshot, by determining one or more changed blocks of the second snapshot, relative to the first non-consecutive snapshot, wherein the one or more changed blocks of the second snapshot are determined by applying an aggregation function to a plurality of bitmaps between the first snapshot and the second snapshot, and wherein the plurality of bitmaps between the first snapshot and the second snapshot comprise a plurality of bits identifying differences with respect to a corresponding snapshot, (ii) performing a differential recovery of the second snapshot from the remote storage system to the local storage system by: (a) copying the determined one or more changed blocks of the second snapshot, relative to the first non-consecutive snapshot, from the remote storage system and (b) using the first snapshot in the local storage system, and (iii) storing the recovered second snapshot in the recovery logical unit in the local storage system.

10. The apparatus of claim 9, wherein, when the second snapshot is after the last recovered snapshot, the differential recovery of the second snapshot comprises reversing one or more write operations associated with the last recovered snapshot.

11. The apparatus of claim 9, wherein a snapshotting module in the local storage system generates the first snapshot according to a predefined data retention policy and wherein an incremental storage module transfers an incremental representation of the first snapshot, relative to the previous snapshot, to the remote storage system.

12. The apparatus of claim 9, wherein the comparing comprises performing a bitwise OR operation between the first bitmap and the allocation bitmap.

13. The apparatus of claim 9, further comprising, in response to a request to restore a second snapshot of the logical unit from the remote storage system, wherein a second bitmap for the second snapshot indicates differences with respect to a previous snapshot of the logical unit:

obtaining the last recovered snapshot and the baseline bitmap from the local storage system;

comparing the second bitmap for the second snapshot to the baseline bitmap for the last recovered snapshot to identify changes to the second snapshot relative to the last recovered snapshot;

performing a differential recovery of the second snapshot, using the identified changes and the last recovered snapshot, from the remote storage system; and storing the second snapshot as the last recovered snapshot as a new baseline version to the recovery logical unit in the local storage system.

14. The apparatus of claim 10, wherein the reversing the one or more write operations associated with the last recovered snapshot comprises performing bitwise OR operations between each subsequent pair of bitmaps between the last recovered snapshot and the second snapshot to obtain a representation of the second snapshot and then performing one or more read operations from the second snapshot from the remote storage system to the recovery logical unit.

15. A non-transitory processor-readable storage medium having stored therein program code of one or more software programs, wherein the program code when executed by at least one processing device causes the at least one processing device to perform the following steps:

in response to a request to restore a first snapshot of a logical unit from a remote storage system to a local storage system, wherein the local storage system is remote from the remote storage system:

obtaining, from the local storage system, a first bitmap for the first snapshot to be restored, wherein the first bitmap indicates differences with respect to a previous snapshot of the logical unit, wherein an earliest maintained snapshot for the logical unit comprises a full snapshot having an allocation bitmap, wherein the allocation bitmap was created prior to receiving the request to restore the first snapshot;

comparing, by at least one processing device associated with the local storage system, the first bitmap to the allocation bitmap associated with the full snapshot to obtain a baseline bitmap representing a baseline version of the first snapshot to be restored;

recovering, by the at least one processing device associated with the local storage system, the baseline version of the first snapshot to be restored, using the baseline bitmap, from the remote storage system to the local storage system, wherein a plurality of snapshots stored in the remote storage system are stored in a time order and wherein the plurality of snapshots stored in the time order are configured to be traversed in a forward direction and a backward direction in time;

storing the baseline version of the first snapshot to be restored as a last recovered snapshot with the baseline bitmap to a recovery logical unit in the local storage system; and following the storing the baseline version of the first snapshot in the recovery logical unit in the local storage system, (i) traversing at least one of forward and backward in time along a lineage of snapshots to recover a second snapshot from the remote storage system to the local storage system, wherein the second snapshot is non-consecutive with the first snapshot, by determining one or more changed blocks of the second snapshot, relative to the first non-consecutive snapshot, wherein the one or more changed blocks of the second snapshot are determined by applying an aggregation function to a plurality of bitmaps between the first snapshot and the second snapshot, and wherein the plurality of bitmaps between the first snapshot and the second snapshot comprise a plurality of bits identifying differences with respect to a corresponding snapshot, (ii) performing a differential recovery of the second snapshot from the remote storage system to the local storage system by: (a) copying the determined one or more changed blocks of the second snapshot, relative to the first non-consecutive snapshot, from the remote storage system and (b) using the first snapshot in the local storage system, and (iii) storing the recovered second snapshot in the recovery logical unit in the local storage system.

16. The non-transitory processor-readable storage medium of claim 15, wherein the comparing comprises performing a bitwise OR operation between the first bitmap and the allocation bitmap.

17. The non-transitory processor-readable storage medium of claim 15, further comprising, in response to a request to restore a second snapshot of the logical unit from the remote storage system, wherein a second bitmap for the second snapshot indicates differences with respect to a previous snapshot of the logical unit:

obtaining the last recovered snapshot and the baseline bitmap from the local storage system;

comparing the second bitmap for the second snapshot to the baseline bitmap for the last recovered snapshot to identify changes to the second snapshot relative to the last recovered snapshot;

performing a differential recovery of the second snapshot, using the identified changes and the last recovered snapshot, from the remote storage system; and storing the second snapshot as the last recovered snapshot as a new baseline version to the recovery logical unit in the local storage system.

18. The non-transitory processor-readable storage medium of claim 15, wherein a snapshotting module in the local storage system generates the first snapshot according to a predefined data retention policy and wherein an incremental storage module transfers an incremental representation of the first snapshot, relative to the previous snapshot, to the remote storage system.

19. The non-transitory processor-readable storage medium of claim 17, wherein, when the second snapshot is after the last recovered snapshot, the differential recovery of the second snapshot comprises reversing one or more write operations associated with the last recovered snapshot.

20. The non-transitory processor-readable storage medium of claim 19, wherein the reversing the one or more write operations associated with the last recovered snapshot comprises performing bitwise OR operations between each subsequent pair of bitmaps between the last recovered snapshot and the second snapshot to obtain a representation of the second snapshot and then performing one or more read operations from the second snapshot from the remote storage system to the recovery logical unit.

* * * * *